Patented Dec. 25, 1945

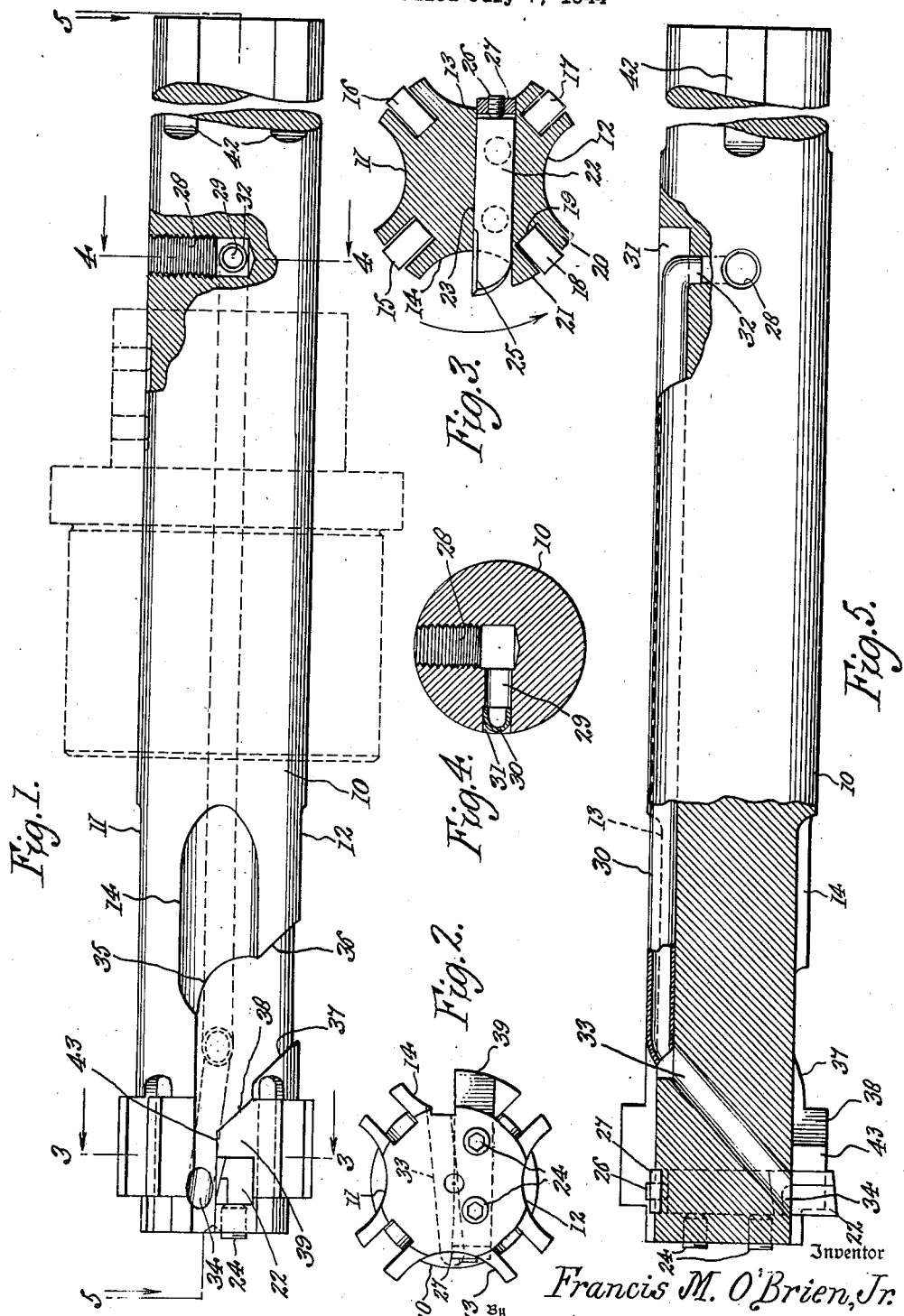

2,391,794

UNITED STATES PATENT OFFICE 2,391,794

BORING BAR

Francis M. O'Brien, Jr., Miami, Fla.

Application July 7, 1944, Serial No. 543,817

5 Claims. (Cl. 77—58)

The present invention relates to improvements in boring bars and has been developed for boring deep holes in steel or other metals.

The invention will be found particularly applicable in boring blind end holes and shouldered holes.

The invention has for an object to provide an improved boring bar constructed and arranged to utilize carbide cutting tools, which allow much greater feed and speed than the standard cutting steels.

A further object of the invention is to produce a construction of boring bar which is relatively simple and which provides ample space to allow for chip clearance.

A still further object of the invention resides in the use of carbide pads, in the relationship of the cutting tool to the carbide pads, and in the grind of the cutting tool itself.

A still further object of the invention is to provide a construction of boring bar in which a single tool bit is so carried that it can be readily replaced and set giving the advantage that a minimum of time is lost when the necessity arises for changing the cutting tool.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side elevation of an improved boring bar constructed in accordance with the present invention.

Figure 2 is an end view of the same from the bit end but without the bit and carbide pads.

Figure 3 is a transverse section taken on the line 3—3 in Figure 1, the arrow indicating the direction of rotation of the work.

Figure 4 is a similar section taken on the line 4—4 in Figure 1.

Figure 5 is a longitudinal section taken on the line 5—5 in Figure 1.

Referring more particularly to the drawing 10 designates generally the body of the bar ordinarily constructed of steel of a generally circular external cross section and of solid construction except for the passage hereinafter referred to.

Four external grooves 11, 12, 13, and 14 run longitudinally of the bar from its bit end inwardly an appropriate distance to allow for chip clearance, these grooves being of concave construction and having their central portions at approximately 90° from one another. Such grooves also serve to separate the carbide pads 15, 16, 17 and 18 which are also displaced from one another at approximately 90° intervals. Such pads are received and retained in pad holders or slots 19 cut to a suitable depth in the bar and flanked by the substantially parallel pairs of walls 20 and 21. The pad is brazed into the slots 19 of the bar to hold them in place, then ground to a specified diameter generally .010 under size of the bore required. The diameter of the pads must be concentric to the ground diameter of the bar body.

In Figure 3 the cutting tool 22 is shown as occupying a transversely extending socket 23, the shank of the tool being held in this socket by one or more set screws 24 (Figures 2 and 5) which enter the end wall of the tool. The tool bit has a reinforced cutting edge 25 of appropriate carbide material. The inner end of the cutting tool shank 22, as shown in Figure 3, engages a set screw 26 variably adjustable through a nut 27, soldered, welded or otherwise secured in the base of the groove 13. By turning the set screw in or out, the exposed cutting edge 25 of the tool 22 may be made to project more or less with reference to the outside diameter of the pads. The operative cutting edge 25 of the tool emerges from the groove 14, boring the hole .006 to .010 over the diameter of the pads so that the pads will not bind or freeze in the bore.

Oil or other coolant may be introduced through a threaded port 28 which opens through the side of the bar some distance from the bit end and which communicates with a right angular passage 29, in turn communicating with a tube 30, of copper or other suitable material. This tube 30 reposes in a longitudinal groove 31 made in one side of the boring bar coincident with the concave groove 13. The rear end of the tube has a right angularly offset end 32 which is fitted tightly into the outer end of the passage 29. The forward end of the tube 30 is shaped to communicate with a diagonal passage 33 which traverses the boring bar from the forward end of the tube 30 transversely and forwardly to a discharge mouth 34 (Figures 1, 2 and 3) which emerges in the external groove 14 just forwardly of the cutting edge 25 of the cutting tool.

In Figure 1 the groove 14 is shown to be cut away at 35 where a spiral groove 36 intersects both grooves 14 and 12. The outer wall 37 of the spiral groove is substantially in line though slightly offset from the inclined wall 38 of the reinforcing block 39 which extends on two sides of the shank of the cutting tool and tends to support the same. This block 39 is in one piece with the boring bar 10 and in one piece with the wall 21 of the holder for the pad 18 which immediately follows the cutting tool.

The end of boring bar opposite the bit end may be formed with flat faces 42. These faces prevent burrs from set screws interfering with removal of the bar from the tool holder.

In the use of the invention the bar 10 is held stationary in a machine supported bushing rest, and fed into revolving work. Speeds and feeds depend on type of material being bored, grind of cutting tool and amount of stock being removed. This causes the cutting portion 25 of the tool to cut away the steel in the surrounding wall of the hole. The removed metal or chips are directly received in the forward part 43 of the external groove 14 and move back along the block 39 until the diagonal or inclined wall 38 is reached; the chips are influenced to take exit through the spiral passage 36 and into the adjoining groove 12 through which the same are moved to the outer part of the bar and evacuated.

Figure 1 shows the relationship between the mouth 34 of the coolant passage 33 and the reinforced portion 25 of the tool bit. It is important that the coolant is supplied to the cutting edge of the tool. This relationship coupled with the diagonal position of the passage 33 insures this result. The reinforced portion or bit 25 will vary with the type of steel to be cut and the speed and feeds used. A standard bit sometimes called in the art a "chip breaker" is .050 to .060 wide .010 to .015 deep and 7° positive rake. The cutting edge of the tool should lead the pads by 1/16 or 1/8 inch. The cutting edge is on the centerline of the bar. The body of the bar may be advantageously made of chrome molybdenum steel heat treated to a tensile strength of 180,000 to 200,000 lbs. per square inch.

The four carbide pads 15, 16, 17 and 18 are 90° apart. The pads 15 and 18 are approximately 45° from the cutting tool 25. These carbide pads are supported by steel 20, 21 on two sides.

The part 27 is a block having an internal screw thread to receive the set screw 26 which is for adjusting the cutting tool in and out. With this adjustment the tool can be set, measuring by use of indicator held in bar bushing.

In use, the boring bar is supported in a bushing rest on a machine. If a bushing rest is not used a short pilot bore should be put in work deep enough for pads on the bar to enter the work.

It is obvious that various changes and modifications may be made in the details of construction and design of the above specifically described embodiment of this invention without departing from the spirit thereof, such changes and modifications being restricted only by the scope of the following claims.

What is claimed is:

1. An improved boring bar comprising a substantially solid bar body of external substantially circular form having four external grooves therein with their central portions at approximately 90° apart and their proximate edges spaced from one another, said external grooves being substantially arcuate with concave bases, said bar having in the spaces between said grooves four slots with substantially parallel walls, said slots opening outwardly through the periphery of the bar, pads affixed in said slots and projecting beyond the periphery of the bar, said bar having a transverse socket opening through diametrically opposed grooves and having one wall coinciding substantially with a diameter of said bar, a cutting tool occupying said socket and slidable therein and having a cutting edge held to a center line position by said diametric wall, said cutting edge projecting into one groove, and adjusting means for the tool contained in the diametrically opposite groove.

2. An improved boring bar as claimed in claim 1 characterized by the fact that that end of the tool which carries the cutting edge and emerges from the socket into one of said grooves is supported on two other sides within its cutting edge by a block integral with the boring bar.

3. An improved boring bar as claimed in claim 1 wherein a block integral with the boring bar projects into the groove occupied by the cutting edge of said tool, said block having a right angular recess with the walls thereof fitting respectively against the tool at a side opposite and a side adjacent the cutting edge, said block also merging with the adjacent wall of the pad holding slot following said tool.

4. A boring bar as claimed in claim 1 in which a block integral with the boring bar extends up into the groove occupied by the projecting end of the tool having the cutting edge and has right angularly extending walls lying against the tool on a side adjacent and on the side opposite said cutting edge, the inner face of the block having a diagonal wall, said boring bar having a spiral groove forming a communication between said groove in which the cutting tool projects and the next following groove, said diagonal wall of the block being cut away in the direction of said spiral groove.

5. A boring bar as claimed in claim 1 in which the boring bar has in that groove which is diametrically opposite to the groove containing the cutting edge of the tool a longitudinally extending channel opening out through the concave wall of such groove, a tube removably mounted in said channel and having a diagonally turned forward end, said boring bar having a diagonal duct leading from the forward end of said tube into the forward part of the groove into which the cutting tool projects, said boring bar having means connecting with the rear end of the tube to supply same with a coolant.

FRANCIS M. O'BRIEN, JR.